S. Beaumont,
Cage Trap,
N°14,531. Patented Mar. 25, 1856.

UNITED STATES PATENT OFFICE.

SAML. BEAUMONT, OF NEW YORK, N. Y.

SELF-SETTING RAT-TRAP.

Specification of Letters Patent No. 14,531, dated March 25, 1856.

*To all whom it may concern:*

Be it known that I, SAMUEL BEAUMONT, of the city, county, and State of New York, have invented a new and Improved Self-Setting Trap for Catching Rats, Game, &c.; and I do hereby declare that the following is a full, clear, and exact description of the same, reference being had to the annexed drawings, making a part of this specification, in which—

Figure 1:
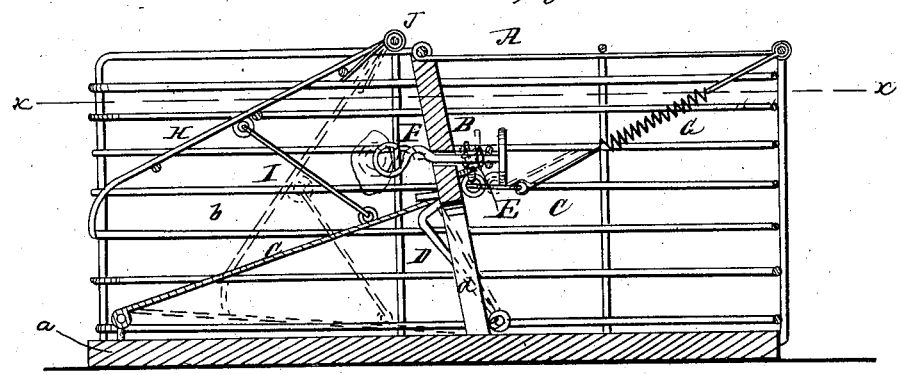
Figure 2:
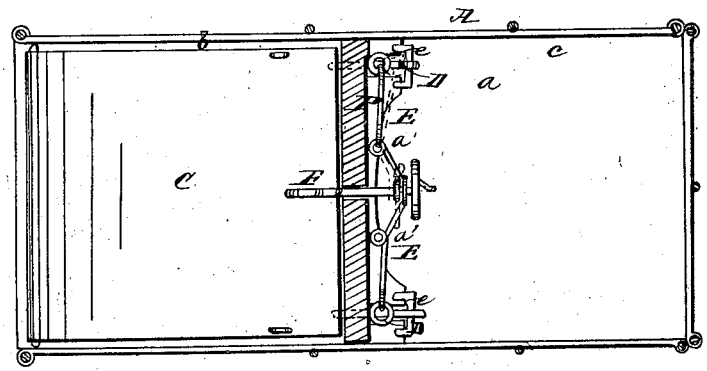

Figure 1, is a longitudinal vertical section of my improvement, the plane of section being through the center. Fig. 2, is a horizontal section of ditto, $(x)$ $(x)$, Fig. 1, showing the plane of section.

Similar letters of reference indicate corresponding parts in the two figures.

My invention consists in attaching the door of the trap to an inclined platform, and having the platform supported by swinging rods or arms which are connected by levers to the bait hook, the several parts being so arranged that when the bait is nibbled by the animal the swinging rods will be drawn from underneath the platform which will descend to a horizontal position in consequence of the weight of the animal which is upon it, the door of the trap closing as the platform descends and thereby preventing the escape of the animal from the box, the animal passing off the platform when it is down into an adjoining apartment of the box and allowing the platform and door to be thrown back to their original position by a spring.

To enable those skilled in the art to fully understand and construct my invention, I will proceed to describe it.

A, represents an oblong rectangular box constructed of wire, and having a solid wooden or metallic bottom $(a)$.

B, represents an inclined partition which divides the box into two compartments $(b)$ $(c)$ said partition having an opening $(d)$ made through its lower part.

C, represents an inclined platform, the outer end of which is hinged or jointed to the end of the bottom $(a)$ of the box A. The inner and elevated end of the platform rests upon the upper ends of two rods or arms D, D, the lower ends of which swing or turn on pivots or rods $(e)$ attached to the lower end of the partition B, the rods or arms being fitted in slots in the partition. The upper parts of the rods or arms are connected by levers E, E, to a bait hook F, which passes horizontally through the partition B. The levers, E, E, have their fulcrum at $(a^1)$, see Fig. 2; the inner ends of the levers being connected to the bait hook, F, and their outer ends to the arms D, D.

G, is a spiral spring one end of which is attached to the back end of the bait hook F, the opposite end of the spring being attached to the box A.

H, is a door, the inner end of which is attached by joints or hinges to the upper part of the box A. This door is connected by rods I, to the platform C.

J, is a spring attached to the door H.

The operation is as follows. The hook F, is baited, and the inner end of the platform rests upon the upper ends of the rods or arms D, D, the door H, being elevated and kept in that position by the spring J. The animal passes upon the platform C, and in nibbling the bait upon the hook F, draws by means of the levers, E, E, the upper ends of the rods or arms D, from underneath the platform C, which in consequence of the weight of the animal descends to a horizontal position and draws down the door H, as shown in red in Fig. 1. The animal finding itself entrapped endeavors to escape and passes through the aperture $(d)$ into the compartment $(c)$ and the platform and door are thrown up to their original position by the spring J, the rods or arms D, passing underneath the platform by their own gravity. The trap is therefore self-setting, and the compartment $(c)$ is the portion of the box in which the animals are confined. The device is simple, efficient, and not liable to get out of repair.

Having thus described my invention, what I claim as new and desire to secure by Letters Patent, is,

Attaching the door H, to the platform C, and supporting said platform when elevated or inclined by means of the swinging rods or arms D, which are connected to the bait hook F, by the levers E, E, the above parts being arranged substantially as shown, or in an equivalent way, and having springs G, J, attached, so that the platform when the animal nibbles the bait will have its supports drawn from underneath it, and be allowed to descend and close the door H, the door and platform rising to their original position when the animal passes off the platform into the compartment $(c)$ of the box.

SAMUEL BEAUMONT.

Witnesses:
WM. TUSCH,
JAMES F. BUCKLEY.